United States Patent
Iso et al.

(10) Patent No.: US 11,170,935 B2
(45) Date of Patent: Nov. 9, 2021

(54) MANUFACTURING METHOD FOR ELECTRONIC COMPONENT INCLUDING ELECTRODE FORMED BY REMOVAL OF INSULATING LAYER BY LASER LIGHT

(71) Applicant: MURATA MANUFACTURING CO., LTD., Kyoto-fu (JP)

(72) Inventors: Eiji Iso, Nagaokakyo (JP); Shinichiro Izumi, Nagaokakyo (JP); Yoshifumi Maki, Nagaokakyo (JP); Hirotsugu Tomioka, Nagaokakyo (JP); Tsuyoshi Kawada, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 600 days.

(21) Appl. No.: 15/661,739

(22) Filed: Jul. 27, 2017

(65) Prior Publication Data

US 2017/0323725 A1 Nov. 9, 2017

Related U.S. Application Data

(63) Continuation of application No. PCT/JP2016/051434, filed on Jan. 19, 2016.

(30) Foreign Application Priority Data

Jan. 30, 2015 (JP) .............................. JP2015-016807

(51) Int. Cl.
*H01F 41/12* (2006.01)
*H01G 4/224* (2006.01)
(Continued)

(52) U.S. Cl.
CPC .......... *H01F 41/12* (2013.01); *H01F 17/0013* (2013.01); *H01F 27/022* (2013.01);
(Continued)

(58) Field of Classification Search
CPC .......... H01G 4/252; H01G 4/224; H01G 2/20; H01F 41/10; H01F 41/12; H01F 41/125; H01F 41/127
See application file for complete search history.

(56) References Cited

U.S. PATENT DOCUMENTS

| | | | | |
|---|---|---|---|---|
| 5,748,065 A | * | 5/1998 | Hashimoto | ........... H01F 27/027 336/192 |
| 6,876,554 B1 | * | 4/2005 | Inagaki | .................. H01G 4/224 361/763 |

(Continued)

FOREIGN PATENT DOCUMENTS

| | | |
|---|---|---|
| CN | 103563020 A | 2/2014 |
| JP | S63-115206 U | 7/1988 |

(Continued)

OTHER PUBLICATIONS

An Office Action mailed by the State Intellectual Property Office of the People's Republic of China dated Mar. 29, 2018, which corresponds to Chinese Patent Application No. 201680007331.5 and is related to U.S. Appl. No. 15/661,739.

(Continued)

*Primary Examiner* — Peter Dungba Vo
*Assistant Examiner* — Jeffrey T Carley
(74) *Attorney, Agent, or Firm* — Studebaker & Brackett PC

(57) ABSTRACT

A manufacturing method for an electronic component includes: a step of forming an insulating layer on an outer electrode body so as to cover the outer electrode body, the outer electrode body being formed on a chip element which forms the electronic component; and a step of removing the insulating layer in a predetermined region of the outer electrode body by applying laser light to the insulating layer in the predetermined region so as to expose the predetermined region. The insulating layer has a higher absorption (Continued)

coefficient for the laser light than a material forming a surface of the outer electrode body.

19 Claims, 13 Drawing Sheets

(51) Int. Cl.
| | |
|---|---|
| *H01G 2/20* | (2006.01) |
| *H01G 4/252* | (2006.01) |
| *H01F 41/04* | (2006.01) |
| *H01G 4/232* | (2006.01) |
| *H01F 41/00* | (2006.01) |
| *H01F 17/00* | (2006.01) |
| *H01F 27/02* | (2006.01) |
| *H01F 41/10* | (2006.01) |
| *H01F 27/28* | (2006.01) |
| *H01F 27/29* | (2006.01) |
| *H01F 27/32* | (2006.01) |
| *H01G 4/30* | (2006.01) |
| *H01G 4/12* | (2006.01) |
| *H01F 17/04* | (2006.01) |

(52) U.S. Cl.
CPC ....... *H01F 27/2804* (2013.01); *H01F 27/292* (2013.01); *H01F 27/32* (2013.01); *H01F 41/005* (2013.01); *H01F 41/041* (2013.01); *H01F 41/046* (2013.01); *H01F 41/10* (2013.01); *H01F 41/125* (2013.01); *H01F 41/127* (2013.01); *H01G 2/20* (2013.01); *H01G 4/224* (2013.01); *H01G 4/232* (2013.01); *H01G 4/252* (2013.01); *H01F 17/04* (2013.01); *H01F 2027/2809* (2013.01); *H01G 4/12* (2013.01); *H01G 4/30* (2013.01)

(56) References Cited

U.S. PATENT DOCUMENTS

| | | | |
|---|---|---|---|
| 2004/0104451 A1* | 6/2004 | Ooi | H01G 4/224 257/532 |
| 2006/0071749 A1* | 4/2006 | Aoki | H01F 17/045 336/83 |
| 2007/0253144 A1* | 11/2007 | Kuwajima | H01G 4/252 361/311 |
| 2009/0096569 A1* | 4/2009 | Choi | H01C 7/003 338/21 |
| 2011/0290542 A1 | 12/2011 | Nishisaka et al. | |
| 2012/0286917 A1* | 11/2012 | Uchida | H01F 17/0013 336/200 |
| 2013/0107421 A1* | 5/2013 | Zenzai | H01G 4/12 361/321.1 |
| 2013/0294006 A1* | 11/2013 | Kang | H01G 4/2325 361/301.4 |
| 2014/0085038 A1 | 3/2014 | Iwasaki | |
| 2015/0036264 A1* | 2/2015 | Morita | C04B 35/4682 361/321.4 |

FOREIGN PATENT DOCUMENTS

| | | |
|---|---|---|
| JP | 2012-069779 A | 4/2012 |
| JP | 2013-026392 A | 2/2013 |
| KR | 10-2006-0045548 A | 5/2006 |
| TW | 201205614 A | 2/2012 |
| TW | 201333989 A | 8/2013 |

OTHER PUBLICATIONS

International Search Report issued in PCT/JP2016/051434; dated Apr. 5, 2016.
Written Opinion issued in PCT/JP2016/051434; dated Apr. 5, 2016.
An Office Action; "Notification of Preliminary Rejection," issued by the Korean Intellectual Property Office dated May 17, 2018, which corresponds to Korean Patent Application No. 10-2017-7021343 and is related to U.S. Appl. No. 15/661,739.

* cited by examiner

MANUFACTURING METHOD FOR ELECTRONIC COMPONENT INCLUDING ELECTRODE FORMED BY REMOVAL OF INSULATING LAYER BY LASER LIGHT

CROSS REFERENCE TO RELATED APPLICATIONS

This application claims benefit of priority to Japanese Patent Application 2015-016807 filed Jan. 30, 2015, and to International Patent Application No. PCT/JP2016/051434 filed Jan. 19, 2016, the entire content of which is incorporated herein by reference.

TECHNICAL FIELD

The present disclosure relates to a manufacturing method for an electronic component and an electronic component.

BACKGROUND

A surface-mounting electronic component, such as a multilayer ceramic capacitor, is mounted on a circuit substrate, which is a mounting subject, of an electronic device typically in the following manner. An outer electrode disposed on the surface of a chip element is electrically and mechanically connected to an electrode on the circuit substrate by reflow soldering, for example.

In accordance with a reduced size of an electronic device on which this type of electronic component is mounted, the density of electronic components mounted on an electronic device is becoming higher. Because of this higher mounting density, an outer electrode of an electronic component may contact another electronic component, thereby causing the occurrence of short-circuiting.

To solve such a problem, Japanese Unexamined Patent Application Publication No. 2013-26392 discloses the following electronic component 101. As shown in FIG. 12, surfaces (both end surfaces, a top surface, and both side surfaces) are covered with an insulating layer 130, except for a surface (bottom surface) 101a which opposes a mounting subject, such as a substrate.

Japanese Unexamined Patent Application Publication No. 2013-26392 also discloses the following manufacturing method for the electronic component 101. As shown in FIG. 13(a) through FIG. 13(c), the bottom surface 101a of the electronic component 101 (see FIG. 12) is fixed on an adhesive holding tool 140. After applying an insulating resin 130a to the surfaces of outer electrodes 120 and a chip element 110 and solidifying the insulating resin 130a, the electronic component 101 is separated from the adhesive holding tool 140. As a result, the electronic component 101 having surfaces (both end surfaces, a top surface, and both side surfaces) covered with the insulating layer 130 except for the exposed bottom surface is manufactured.

The electronic component 101 configured as described above is mounted on a mounting substrate such that the bottom surface opposes the mounting substrate. Thus, highly reliable, high-density mounting can be performed while preventing the occurrence of short-circuiting of the outer electrodes 120 with another electronic component.

SUMMARY

Technical Problem

However, in the manufacturing method for an electronic component disclosed in Japanese Unexamined Patent Application Publication No. 2013-26392, the bottom surface of the electronic component 101, that is, the region abutting the adhesive holding substrate 140, is entirely exposed. When mounting the electronic component 101 on a mounting substrate, the exposed regions of the outer electrodes 120 are bonded to the mounting substrate. Such exposed regions are unable to be formed into a desired shape.

The insulating layer 130 may be formed on the entire surfaces of the electronic component 101 by soaking it in a resin which forms the insulating layer, and then, part of the insulating layer 130 may be removed by using a grinding wheel, for example. In this method, however, the amount of insulating layer 130 to be removed is difficult to control, so that the outer electrodes 120 positioned inward may also be removed together with the insulating layer 130.

The present disclosure has been made to solve the above-described problems. It is an object of the present disclosure to provide a manufacturing method for an electronic component in which a desired region of an insulating layer covering an outer electrode of the electronic component can be removed properly without damaging the outer electrode and in which the occurrence of short-circuiting with another electronic component can be prevented, and also to provide an electronic component.

Solution to Problem

To solve the above-described problems, a manufacturing method for an electronic component according to the present disclosure includes: a step of forming an insulating layer on an outer electrode body so as to cover the outer electrode body, the outer electrode body being formed on a chip element which constitutes the electronic component; and a step of removing the insulating layer located in a predetermined region of the outer electrode body so as to expose the predetermined region by applying laser light to the insulating layer in the predetermined region, the insulating layer having a higher absorption coefficient for the laser light than that of a material constituting a surface of the outer electrode body.

In the manufacturing method for an electronic component according to the present disclosure, the outer electrode body may preferably include an electrode body and a metal plated layer. The electrode body is formed on the chip element and is made of a conductive resin material. The metal plated layer is formed to cover the electrode body.

The electrode body of the outer electrode body made of a conductive resin material is covered with the metal plated layer that is hard to absorb laser light. Consequently, the electrode body (resin material) is not removed in the step of removing the insulating layer in the predetermined region by the application of laser light. The exposed region of the outer electrode body can thus be formed into a desired shape.

The metal plated layer may preferably be a Ni-plated layer.

Laser light is less likely to be absorbed by the Ni-plated layer, and thus, the exposed region of the outer electrode body can be formed into a desired shape. As a result, the present disclosure is made more effective.

The manufacturing method for an electronic component according to the present disclosure may preferably further include a step of forming a Sn-plated layer to cover the region of the outer electrode body which is exposed by removing the insulating layer.

This configuration makes it possible to increase the reliability of bonding the electronic component to a mounting subject by using solder.

The outer electrode body may be made of a material which does not contain a resin component.

The outer electrode body, which is made of a material without a resin component therein, is hard to absorb laser light, which may eliminate the need to provide a metal plated layer on the outer electrode body. A plating step prior to the application of laser light may be omitted, and the steps can be simplified.

Examples of the outer electrode body made of a material which does not contain a resin component are a baked electrode (thick-film electrode) formed by applying a conductive paste containing metal particles and glass and by firing the conductive paste and a thin-film electrode formed by sputtering or vapor deposition.

The manufacturing method may further include a step of forming a coating plated layer to cover the region of the outer electrode body which is exposed by removing the insulating layer.

This configuration makes it possible to increase the reliability of bonding the electronic component to a mounting subject.

The step of forming the coating plated layer may preferably include a step of forming a Ni-plated layer as an underlying layer and a step of forming a Sn-plated layer as an outermost layer.

This configuration makes it possible to increase the reliability of bonding the electronic component to a mounting subject by using solder.

The chip element may be constituted by a composite material of a resin material and a metal powder. The outer electrode body may be constituted by a conductive material formed on the chip element and a metal plated layer formed to cover the conductive material.

The resin material of the chip element is covered with the metal plated layer that is hard to absorb laser light. Consequently, the resin material of the chip element is not removed in the step of removing the insulating layer in the predetermined region by the application of laser light. The exposed region of the outer electrode body can thus be formed into a desired shape.

The metal plated layer may be a Cu-plated layer.

When plating is performed, the use of Cu makes it easier for the Cu-plated layer to adhere to the conductive material.

The metal plated layer is constituted by a Cu-plated layer and a Ni-plated layer formed to cover the Cu-plated layer.

When plating is performed, the use of Cu makes it easier for the Cu-plated layer to adhere to the conductive material. The Ni-plated layer protects the Cu-plated layer.

The manufacturing method may further include a step of forming a Sn-plated layer to cover the region of the outer electrode body which is exposed by removing the insulating layer.

Forming of the Sn-plated layer increases the reliability of bonding the electronic component to a mounting subject by using solder.

The manufacturing method may further include a step of forming a Ni-plated layer as an underlying layer and a Sn-plated layer as an outermost layer so as to cover the region of the outer electrode body which is exposed by removing the insulating layer.

Forming of the Sn-plated layer increases the reliability of bonding the electronic component to a mounting subject by using solder. The Ni-plated layer can prevent mutual diffusion between the Cu-plated layer and the Sn-plated layer.

In a case where the electronic component is to be mounted on a mounting subject, the insulating layer covers a region of the outer electrode body where the outer electrode body of the electronic component will be bonded to the mounting subject directly or via a plated layer, and the insulating layer covering the region of the outer electrode body may preferably be removed by application of the laser light.

This configuration makes it possible to increase the reliability of electrical and mechanical bonding between the electronic component and the mounting subject, thereby making the present disclosure more effective.

In a case where the outer electrode body is formed on each of both end portions of the chip element, the laser light may preferably be applied to the insulating layer in a plurality of separate portions of each of the outer electrode bodies so as to remove the insulating layer in the plurality of separate portions.

With this configuration, the electronic component can be bonded to a mounting subject at a plurality of portions of the outer electrode body, thereby physically stabilizing the electronic component when being bonded to the mounting subject.

A material constituting the insulating layer may preferably be a resin material.

Laser light is more likely to be absorbed by a resin material forming the insulating layer, thereby making the present disclosure more effective.

The laser light may preferably have a wavelength of 1.06 μm to 10.6 μm.

This type of laser light is more likely to be absorbed by a resin material, thereby making the present disclosure more effective.

An electronic component according to the present disclosure includes: a chip element; an outer electrode body provided on the chip element; an insulating layer that covers the outer electrode body such that a predetermined region of the outer electrode body is exposed; and a coating plated layer that covers the predetermined region of the outer electrode body and that is exposed without the insulating layer thereon.

In the above-described configuration, the coating plated layer covers the predetermined region of the outer electrode body. Consequently, the coating plated layer can be disposed in a desired region. It is thus possible to perform highly reliable, high-density mounting while preventing the occurrence of short-circuiting with another electronic component.

The coating plated layer covers the predetermined region of the outer electrode body and is exposed without the insulating layer thereon. That is, the surface of the coating plated layer is not covered with the insulating layer. When the coating plated layer of the electronic component is bonded to a mounting subject by soldering, it is not possible that solder enter a portion between the surface of the coating plated layer and the insulating layer. As a result, the insulating layer is not broken.

In contrast, if at least part of the surface of the coating plated layer is covered with the insulating layer, solder used for bonding the coating plated layer of the electronic component to a mounting subject may enter a portion between the surface of the coating plated layer and the insulating layer. This may break the insulating layer.

The outer electrode body may include an electrode body which is formed on the chip element and made of a conductive resin material, and a metal plated layer covering the electrode body.

With this configuration, the metal plated layer can prevent mutual diffusion between the electrode body and the coating plated layer.

The metal plated layer may be a Ni-plated layer, and the coating plated layer may be a Sn-plated layer.

With this configuration, the metal plated layer can prevent mutual diffusion between the electrode body and the coating plated layer.

The outer electrode body may be made of a material which does not contain a resin component. The coating plated layer may be constituted by a Ni-plated layer and a Sn-plated layer covering the Ni-plated layer.

With this configuration, the Ni-plated layer can prevent mutual diffusion between the outer electrode body and the Sn-plated layer.

The chip element may be constituted by a composite material of a resin material and a metal powder. The outer electrode body may be constituted by a conductive material provided on the chip element and a metal plated layer covering the conductive material.

The chip element is made of a composite material of a resin material and a metal powder. The metal plated layer can be provided on the chip element with the conductive material therebetween.

The metal plated layer may be a Cu-plated layer. The coating plated layer may be constituted by a Ni-plated layer and a Sn-plated layer covering the Ni-plated layer.

The Ni-plated layer can prevent mutual diffusion between the Cu-plated layer and the Sn-plated layer. The Ni-plated layer, which is disposed between the Cu-plated layer and the Sn-plated layer, can also prevent whiskering which would occur between the Cu-plated layer and the Sn-plated layer.

The metal plated layer may be constituted by a Cu-plated layer and a Ni-plated layer covering the Cu-plated layer. The coating plated layer may be a Sn-plated layer.

The Ni-plated layer can prevent mutual diffusion between the Cu-plated layer and the Sn-plated layer. The Ni-plated layer, which is disposed between the Cu-plated layer and the Sn-plated layer, can also prevent whiskering which would occur between the Cu-plated layer and the Sn-plated layer.

The metal plated layer may be constituted by a Cu-plated layer and a Ni-plated layer covering the Cu-plated layer. The coating plated layer may be constituted by a Ni-plated layer and a Sn-plated layer covering the Ni-plated layer.

The Ni-plated layer can prevent mutual diffusion between the Cu-plated layer and the Sn-plated layer. The Ni-plated layer, which is disposed between the Cu-plated layer and the Sn-plated layer, can also prevent whiskering which would occur between the Cu-plated layer and the Sn-plated layer.

Advantageous Effects of Disclosure

According to a manufacturing method for an electronic component according to the present disclosure, an insulating layer in a predetermined region of an outer electrode body is removed by applying laser light to the insulating layer in the predetermined region. The insulating layer has a higher absorption coefficient for the laser light than a material forming a surface of the outer electrode body. It is thus possible to properly remove the insulating layer covering the outer electrode in the predetermined region.

The exposed region of the outer electrode which will be bonded to a mounting subject can thus be formed into a desired shape. As a result, an electronic component which can highly reliably be bonded to a mounting subject electrically and mechanically can be efficiently manufactured.

In the manufacturing method for an electronic component according to the present disclosure, it is important to form an insulating layer to cover the outer electrode body in the step of forming the insulating layer. If the outer electrode body is properly covered with the insulating layer, the covering of the surface of the chip element other than the electrode body with the insulating layer is not essential. However, in terms of the moisture resistance and the weather resistance of an electronic component to be manufactured, the surface of the chip element, as well as the outer electrode body, is desirably covered with the insulating layer.

In the manufacturing method for an electronic component according to the present disclosure, after the insulating layer on the outer electrode body in a predetermined region is removed by the application of laser light so as to expose the predetermined region, metal plating may be performed on the exposed region, and then, the outer electrode body may be used as an outer electrode. Alternatively, after the predetermined region of the outer electrode body is exposed, the outer electrode body may be used as an outer electrode without performing plating thereon.

In an electronic component according to the present disclosure, a coating plated layer covers a predetermined region of the outer electrode body. Consequently, the coating plated layer can be disposed in a desired region. It is thus possible to perform highly reliable, high-density mounting while preventing the occurrence of short-circuiting with another electronic component.

BRIEF DESCRIPTION OF DRAWINGS

FIG. 1(a) is a sectional front view of the electronic component; and FIG. 1(b) is a bottom view of the electronic component.

FIG. 3(a) is a sectional front view of the electronic component; and FIG. 3(b) is a bottom view of the electronic component.

FIG. 5(a) is a sectional front view of the electronic component; and FIG. 5(b) is a bottom view of the electronic component.

FIG. 7(a) is a plan view of the mask; and FIG. 7(b) is a sectional view taken along line 1-1 in FIG. 7(a).

FIG. 9(a) is a sectional view of another mode of the electronic component according to the third embodiment; and FIG. 9(b) is a sectional view of another mode of the electronic component according to the third embodiment.

FIG. 10(a) is a sectional front view of the electronic component; and FIG. 10(b) is a bottom view of the electronic component.

FIG. 11(a) is a perspective view of L-shaped electrodes; and FIG. 11(b) is a perspective view of angular C-shaped electrodes.

DETAILED DESCRIPTION

Features of the present disclosure will be described below in greater detail through illustration of embodiments. These embodiments will be described by taking a multilayer inductor as an example of an electronic component.

First Embodiment

Figure 1A:
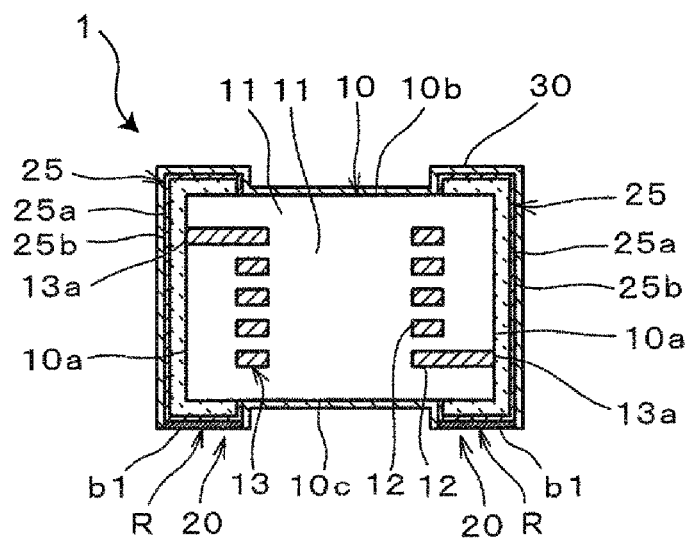
FIG. 1(a) and FIG. 1(b) illustrate an electronic component manufactured by a manufacturing method for an electronic component according to a first embodiment of the present disclosure.
Figure 1B:
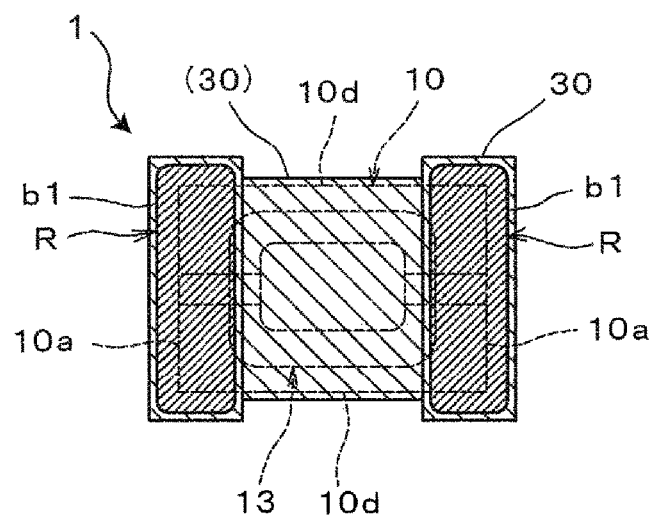

FIG. 1(a) and FIG. 1(b) illustrate an electronic component 1 manufactured by a manufacturing method for an electronic component according to a first embodiment of the present disclosure.

The electronic component 1 includes a chip element 10 and a pair of outer electrodes 20. The chip element 10 includes plural magnetic ceramic layers 11 and a coil 13 formed by connecting plural inner conductors 12 stacked on each other with the magnetic ceramic layers 11 therebetween by using via-conductors (not shown). The outer electrodes 20 are disposed on end surfaces 10a of the chip element 10 so that they can be electrically connected to both end portions 13a of the coil 13.

The outer electrodes 20 are formed to extend from the end surfaces 10a to part of a top surface 10b, part of a bottom surface 10c, and part of both side surfaces 10d of the chip element 10.

The electronic component 1 is entirely covered with an insulating layer 30, except for regions on the bottom surfaces (bottom surface regions) R of the outer electrodes 20, which oppose a mounting subject, such as a circuit substrate.

The outer electrodes 20 each include (a) an outer electrode body 25 and (b) a Sn-plated layer b1. The outer electrode body 25 includes an electrode body 25a and a metal plated layer 25b (Ni-plated layer in this embodiment). The electrode body 25a is formed on the surface of the chip element 10 so that it can be electrically connected to the coil 13. The electrode body 25a is constituted by a resin electrode in which conductive material particles (metal particles) are dispersed in a resin. The metal plated layer 25b is formed to cover the entire surface of the electrode body 25a. The Sn-plated layer b1 is formed to cover the bottom surface region (exposed region) R of the outer electrode body 25 which is not covered with the insulating layer 30.

When mounting the electronic component 1 configured as described above on a mounting subject, such as a circuit substrate, the outer electrodes 20 (Sn-plated layers b1 forming the surfaces of the outer electrodes) exposed at the bottom surface regions R, which are not covered with the insulating layer 30, are electrically and mechanically connected to conductors (such as land patterns) on the mounting subject by reflow soldering, for example.

That is, the electrode bodies 25a formed on the chip element 10 are bonded to the conductors on the mounting subject via the metal plated layers (Ni-plated layers) 25b and the Sn-plated layers b1. The shape of the bottom surface regions R of the outer electrode bodies 25 which are not covered with the insulating layer 30 is not limited to a particular shape, and may be formed in any shape in which the electronic component 1 and a mounting subject can be electrically and mechanically bonded to each other reliably.

In short, the electronic component 1 includes a chip element 10, outer electrode bodies 25 disposed on the chip element 10, an insulating layer 30 which covers the outer electrode bodies 25 so that predetermined regions R of the outer electrode bodies 25 can be exposed, and coating plated layers which cover the predetermined regions R of the outer electrode bodies 25 and which are exposed without the insulating layer 30 thereon.

In the above-described configuration, the coating plated layers cover the predetermined regions R of the outer electrode bodies 25. Consequently, the coating plated layers can be disposed in a desired region. It is thus possible to perform highly reliable, high-density mounting while preventing the occurrence of short-circuiting with another electronic component 1.

The coating plated layers cover the predetermined regions R of the outer electrode bodies 25 and are exposed without the insulating layer 30 thereon. That is, the surfaces of the coating plated layers are not covered with the insulating layer 30. When mounting the electronic component 1 on a mounting subject by soldering, it is not possible that solder may enter a portion between the surfaces of the coating plated layers and the insulating layer 30. As a result, the insulating layer 30 is not broken.

In contrast, if the surfaces of the coating plated layers are at least partially covered with the insulating layer 30, solder used for bonding the coating plated layers of the electronic component 1 to a mounting subject may enter a portion between the surfaces of the coating plated layers and the insulating layer 30. This may break the insulating layer 30.

The outer electrode bodies 25 each include an electrode body 25a disposed on the chip element 10 and constituted by a conductive resin material and a metal plated layer 25b covering the electrode body 25a. The metal plated layer 25b can prevent mutual diffusion between the electrode body 25a and the coating plated layer.

The metal plated layer 25b is a Ni-plated layer, and the coating plated layer is the Sn-plated layer b1. The Ni-plated layer can prevent mutual diffusion between the electrode body 25a (Ag metal particles) and the Sn-plated layer b1.

The chip element 10 is formed in the shape of a substantially rectangular parallelepiped constituted by the two end surfaces 10a, the top surface 10b, the bottom surface 10c, and the two side surfaces 10d. The outer electrode body 25 is a five-sided electrode disposed on one end surface 10a, the top surface 10b, the bottom surface 10c, and both side surfaces 10d.

The Ni-plated layer (metal plated layer 25b) covers the entirety of the electrode body 25a. When removing the insulating layer 30 in the predetermined region R by a laser, which will be discussed later, the Ni-plated layer protects the electrode body 25a from a laser. A Cu-plated layer may be provided instead of a Ni-plated layer. However, a Ni-plated layer is less vulnerable to a laser than a Cu-plated layer.

A manufacturing method for the electronic component configured as described above will be described below with reference to FIG. 2(a) through FIG. 2(d).

In this embodiment, the electronic component is manufactured by a step of forming a chip element, a step of forming outer electrode bodies, a step of forming an insulating layer, a step of removing the insulating layer in predetermined regions, and a step of forming Sn-plated layers, which will be discussed below.

(1) Forming of Chip Element

Magnetic green sheets on which inner conductor patterns are formed by applying a conductive paste thereto and magnetic green sheets without inner conductor patterns used for outer layers are stacked and pressure-bonded to each other in a predetermined order, thereby forming a multilayer block. Then, this multilayer block is cut and divided into individual chips. The individual chips are then fired. As a result, the chip element 10 is formed.

The chip element 10 is formed in the shape of a substantially rectangular parallelepiped constituted by the two end surfaces 10a, the top surface 10b, the bottom surface 10c, and the two side surfaces 10d. The corner and ridge portions of the chip element 10 are chamfered and rounded by barrel polishing, for example.

As the material for the magnetic green sheets, ferrite or a magnetic material containing a metal magnetic substance as a principal component may be used. As the material for the inner conductor patterns, a conductive material containing Ag, Pd, or Cu as a principal component may be used.

(2) Forming of Outer Electrode Bodies

Then, by applying a conductive resin material to both end surfaces 10a of the chip element 10 and by solidifying the conductive resin material, the electrode bodies 25a are formed. The conductive resin material is constituted by metal particles of Ag or Cu as a principal component and a resin material.

Then, plating is performed so that the metal plated layers 25b can be formed to cover the electrode bodies 25a. More specifically, electrolytic Ni plating is performed to form Ni-plated layers to cover the surfaces of the electrode bodies 25a. Prior to electrolytic Ni plating, electroless plating may be performed to form underlying plated layers.

(3) Forming of Insulating Layer

Figure 2A:
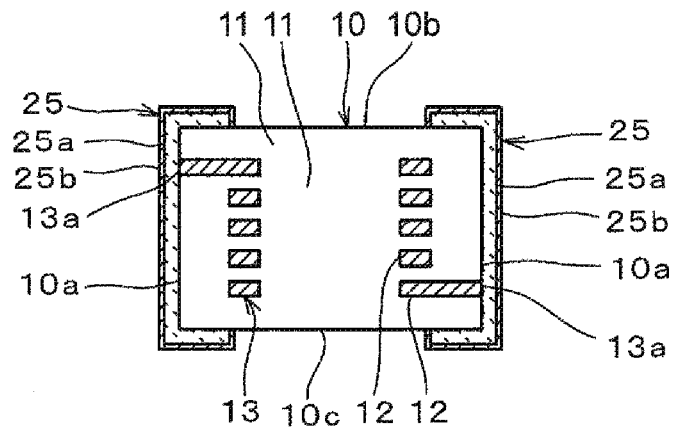
FIG. 2(a) through FIG. 2(d) illustrate a manufacturing method for the electronic component according to the first embodiment.
Figure 2B:
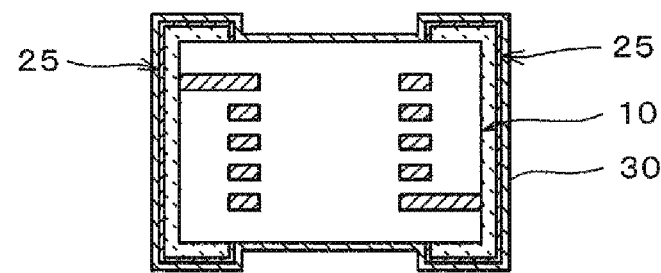

Then, as shown in FIG. 2(b), the insulating layer 30 is formed on the entire surfaces of the chip element 10 including the outer electrode bodies 25. The insulating layer 30 may be formed by applying an insulating material, such as by soaking the chip element 10 in an insulating material (an insulating paste, for example), and then by drying the insulating material.

The thickness of the insulating layer 30 is desirably 3 to 20 µm, for example. An insulating paste may be applied by spray coating, electrodeposition coating, or drum coating.

As the material for the insulating layer 30, a resin material having insulating properties and having a high absorption coefficient for laser light is used. In this embodiment, as the material for the insulating layer 30, a fluoropolymer is used. Other resin materials, such as an epoxy resin and an acrylic resin, or a material having insulating properties other than a resin material, such as a ceramic material, may be used.

(4) Removing of Insulating Layer in Predetermined Regions

Figure 2C:
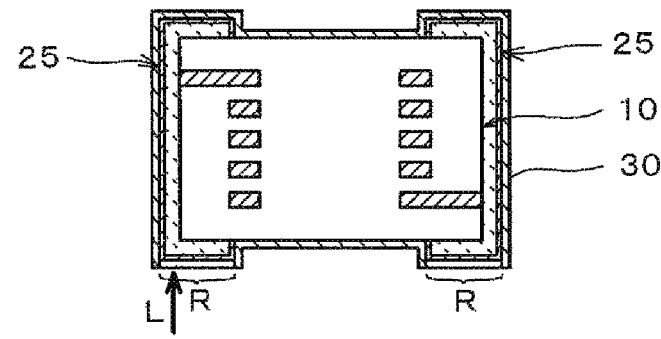

Then, as shown in FIG. 2(c), laser light L is applied to the insulating layer 30 in the predetermined regions (bottom surface regions) R, thereby removing the insulating layer 30 in the bottom surface regions R. That is, by removing the insulating layer 30 covering the outer electrode bodies 25 in the bottom surface regions R, the outer electrode bodies 25 are exposed on the bottom surface 10c.

The bottom surface regions R where the outer electrode bodies 25 are exposed can be formed into a shape suitable for a mounting subject by the scanning of laser light L.

In this embodiment, as the type of laser of laser light L to be applied, $YVO_4$ laser having a wavelength of 1.06 µm is used. The absorption coefficient of the material forming the surfaces (Ni-plated layers) of the outer electrode bodies 25 for $YVO_4$ laser light is lower than that of the insulating layer 30. By the application of laser light L, the insulating layer 30 absorbs $YVO_4$ laser light, while the outer electrode bodies 25 do not absorb $YVO_4$ laser light and reflect a large part of it. As a result, only the insulating layer 30 is substantially removed, while the outer electrode bodies 25 are not removed.

By the application of laser light L, the bottom surface regions R of the outer electrode bodies 25 which were coated with the insulating layer 30 are exposed. Exposed regions of the outer electrode bodies 25 can be formed in this manner.

As the type of laser to be applied, lasers other than $YVO_4$ laser, such as YAG laser, $CO_2$ laser, excimer laser, and UV laser, may be used.

(5) Forming of Sn-Plated Layers

Figure 2D:
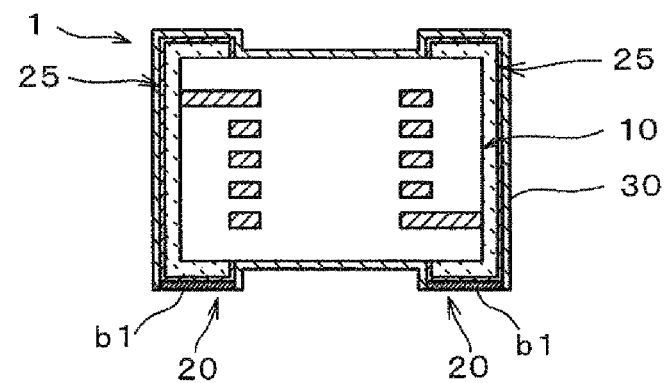

Then, as shown in FIG. 2(d), Sn-plated layers b1 are formed on the outer electrode bodies 25 (Ni-plated layers) exposed in the bottom surface regions R.

As a result, the electronic component 1 configured as shown in FIG. 1(a) and FIG. 1(b) is obtained.

In the first embodiment, the metal plated layer 25b of each of the outer electrode bodies 25 is constituted only by the Ni-plated layer. However, a Sn-plated layer may also be formed to cover the Ni-plated layer, and then, the insulating layer 30 may be formed on the surface of the Sn-plated layer. In this case, the step of forming Sn-plated layers after removing the insulating layer 30 in the predetermined regions R may be omitted.

Second Embodiment

Figure 3A:
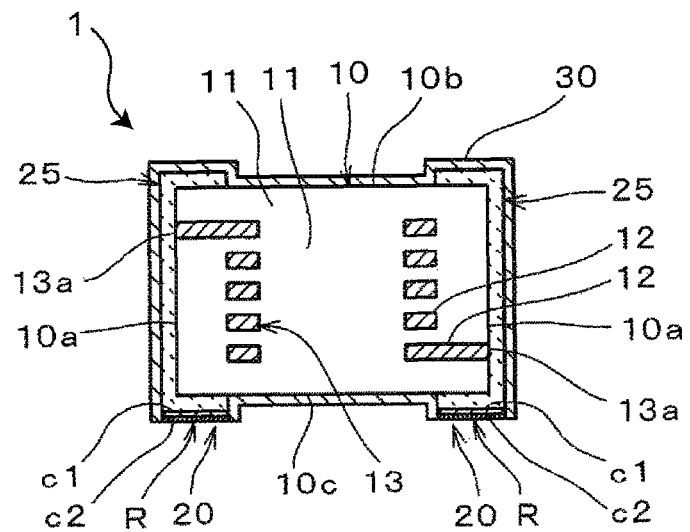
FIG. 3(a) and FIG. 3(b) illustrate an electronic component manufactured by a manufacturing method for an electronic component according to a second embodiment of the present disclosure.
Figure 3B:
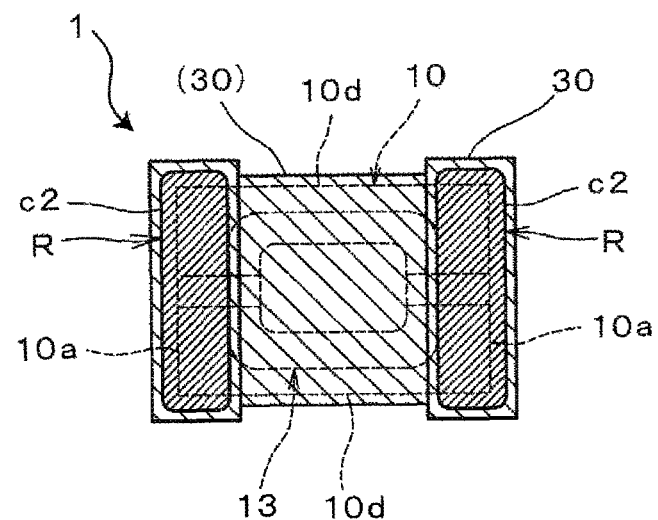

FIG. 3(a) and FIG. 3(b) illustrate an electronic component 1 manufactured by a manufacturing method for an electronic component according to a second embodiment of the present disclosure. The configuration of the electronic component 1 is different from that of the first embodiment in the following point. In the electronic component 1 of the first embodiment, the outer electrode bodies 25 are each formed by coating the surface of the electrode body 25a constituted by a resin electrode with the Ni-plated layer. In contrast, the outer electrode bodies 25 of the electronic component 1 of the second embodiment are baked electrodes (thick-film electrodes) formed by applying a conductive paste containing metal particles and glass and by firing the conductive paste.

The electronic component according to the second embodiment will be described below.

As shown in FIG. 3(a) and FIG. 3(b), as well as in the electronic component of the above-described first embodiment, the electronic component 1 of the second embodiment is entirely covered with an insulating layer 30, except for regions on the bottom surfaces (bottom surface regions) R of the outer electrodes 20, which oppose a mounting subject, such as a circuit substrate.

That is, in the electronic component 1 of the second embodiment, a chip element 10 including the outer electrode bodies, which are baked electrodes (thick-film electrodes), is directly covered with the insulating layer 30.

The electronic component 1 is entirely covered with the insulating layer 30, except for regions on the bottom surfaces (bottom surface regions) R of the outer electrodes 20, which oppose a mounting subject, such as a circuit substrate.

The outer electrodes 20 each include a Ni-plated layer c1 and a Sn-plated layer c2 in the bottom surface region (exposed region) R which is not covered by the insulating layer 30. The Ni-plated layer c1 is an underlying layer directly formed on the surface of the outer electrode body 25. The Sn-plated layer c2 is formed on the surface of the Ni-plated layer c1 as the outermost layer.

The configuration of the other portions of the electronic component 1 is similar to that of the first embodiment.

In short, the electronic component 1 of the second embodiment differs from that of the first embodiment in the following points. The outer electrode bodies 25 are made of a material which does not contain resin components. The coating plated layers are each constituted by the Ni-plated layer c1 and the Sn-plated layer c2 covering the Ni-plated layer c1. The Ni-plated layer c1 can prevent mutual diffusion between the outer electrode body 25 (baked Ag electrode) and the Sn-plated layer c2. A Ni—Sn alloy is formed in the Ni-plated layer c1, thereby increasing the mountability.

The Ni-plated layer c1 only covers the predetermined region R of the outer electrode body 25 which is exposed without the insulating layer 30 thereon. The outer electrode body 25 is a baked electrode which does not contain resin components. Resin components contained in the outer electrode body 25 would otherwise be removed when removing the insulating layer 30 in the predetermined region R by the application of laser. For this reason, the Ni-plated layer c1 is provided only in the predetermined region R, instead of being provided on the entirety of the outer electrode body 25.

A manufacturing method for the electronic component configured as described above will be described below with reference to FIG. 4(a) through FIG. 4(d).

Figure 4A:
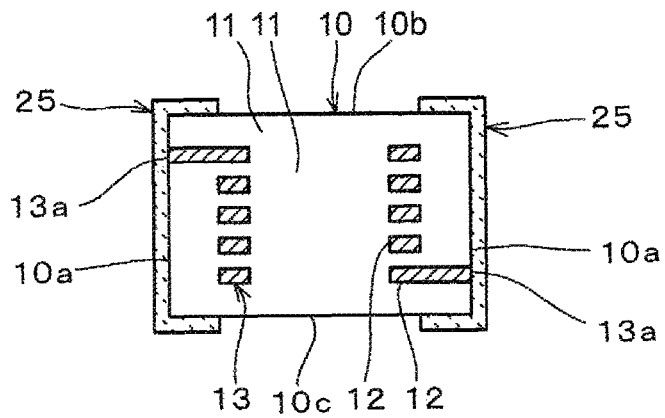
FIG. 4(a) through FIG. 4(d) illustrate a manufacturing method for the electronic component according to the second embodiment.

As shown in FIG. 4(a), the outer electrode bodies 25 are formed by applying a conductive paste containing metal particles made of Ag or Cu as a principal component and glass to both end surfaces 10a of the chip element 10 and by firing the conductive paste. As discussed above, the outer electrode bodies of the second embodiment are baked electrodes (thick-film electrodes) formed by applying and firing a conductive paste and do not contain resin components.

The outer electrode bodies 25 without resin components may be formed by a process other than by applying and firing a conductive paste, such as a sputtering or vapor-deposition process.

Figure 4B:
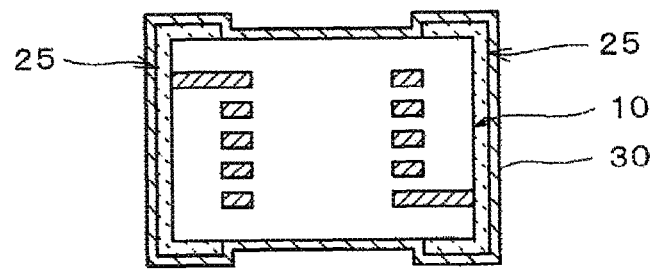

Then, as shown in FIG. 4(b), the insulating layer 30 is formed on the entire surface of the chip element 10 including the outer electrode bodies 25.

As the material for the insulating layer 30, a resin material having a high absorption coefficient for laser light L is used, as in the first embodiment.

Figure 4C:
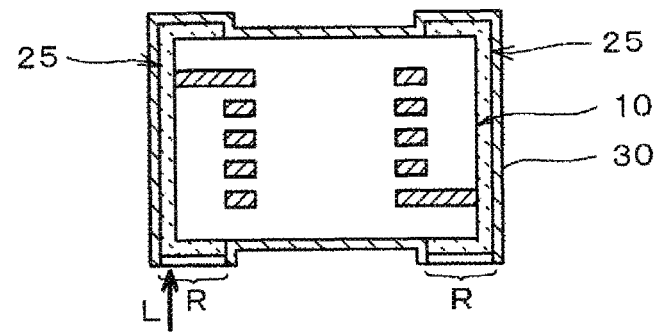

Then, as shown in FIG. 4(c), laser light L is applied to the insulating layer 30 in the predetermined regions (bottom surface regions) R, thereby removing the insulating layer 30 in the bottom surface regions R. That is, by removing the insulating layer 30 covering the outer electrode bodies 25 in the bottom surface regions R, the outer electrode bodies 25 are exposed on the bottom surface 10c.

Figure 4D:
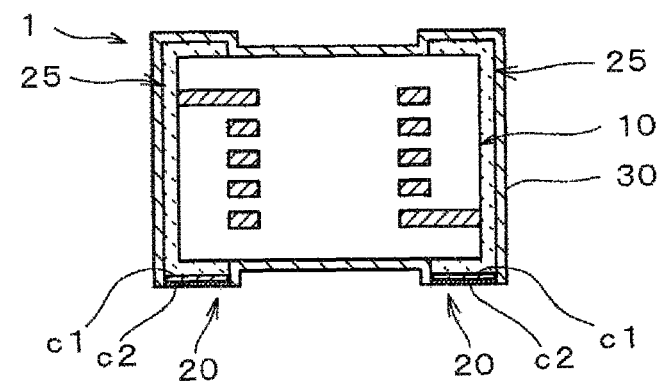

Then, as shown in FIG. 4(d), the Ni-plated layer c1 is formed as an underlying layer on the surface of each of the outer electrode bodies 25 exposed in the bottom surface regions R. The Sn-plated layer c2 is then formed on the surface of the Ni-plated layer c1 as the outermost layer.

As a result, the electronic component 1 configured as shown in FIG. 3(a) and FIG. 3(b) is obtained.

Third Embodiment

Figure 5A:
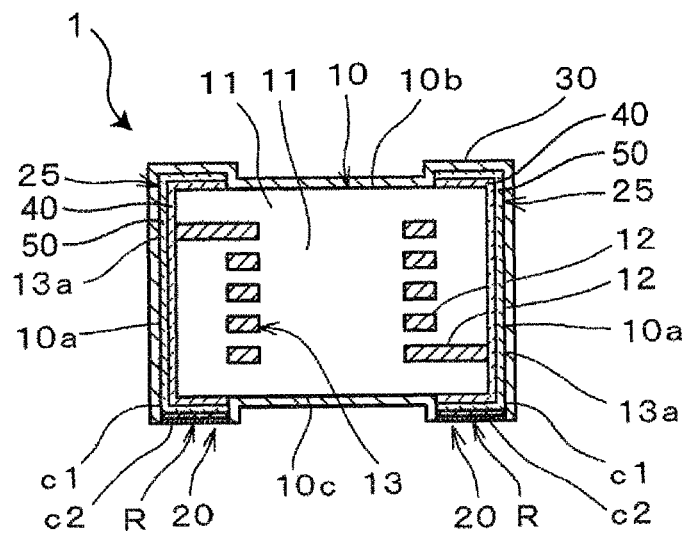
FIG. 5(a) and FIG. 5(b) illustrate an electronic component manufactured by a manufacturing method for an electronic component according to a third embodiment of the present disclosure.
Figure 5B:
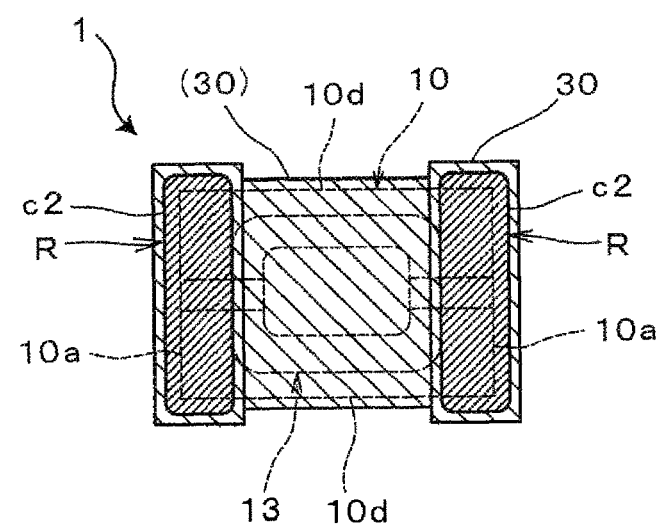

FIG. 5(a) and FIG. 5(b) illustrate an electronic component 1 manufactured by a manufacturing method for an electronic component according to a third embodiment of the present disclosure. The third embodiment is different from the second embodiment in the configuration of the chip element and that of the outer electrode bodies. The configurations of the elements different from those of the second embodiment will be discussed. The configuration of the other elements is similar to that of the second embodiment, and an explanation thereof will thus be omitted.

A chip element 10 is made of a composite material of a resin material and a metal powder. The resin material is an organic insulating material such as an epoxy resin, bismaleimide, a liquid crystal polymer, and polyimide. The metal powder is, for example, a FeSi alloy such as a FeSiCr alloy, a FeCo alloy, a Fe alloy such as a NiFe alloy, or an amorphous alloy thereof.

The outer electrode bodies 25 each include a conductive material 40 disposed on the chip element 10 and a metal plated layer 50 covering the conductive material 40. The conductive material 40 is a material which can adhere to the chip element to provide conductivity. Examples of such a material are transition metal ions, colloids containing thereof, conductive polymers, and graphite. The conductive material 40 is at least one metal selected from a group of palladium, tin, silver, and copper.

The metal plated layer 50 is a Cu-plated layer. The coating plated layer is constituted by a Ni-plated layer c1 and a Sn-plated layer c2 covering the Ni-plated layer c1.

The Ni-plated layer c1 can prevent mutual diffusion between the Cu-plated layer and the Sn-plated layer c2. The Ni-plated layer c1, which is disposed between the Cu-plated layer and the Sn-plated layer c2, can also prevent whiskering which would occur between the Cu-plated layer and the Sn-plated layer c2.

The chip element 10 is made of a composite material of a resin material and a metal powder. The metal plated layer 50 can be provided on the chip element 10 with the conductive material therebetween.

A manufacturing method for the electronic component 1 will be described below.

Figure 6:
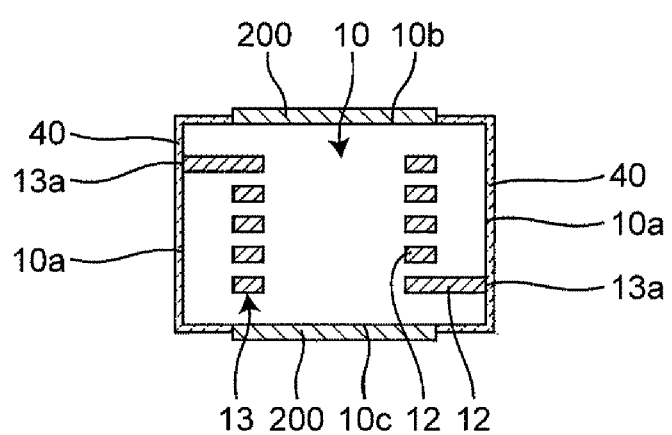
FIG. 6 illustrates a manufacturing method for the electronic component according to the third embodiment.

As shown in FIG. 6, part of the chip element 10 is first covered with a mask 200 so that both end surfaces 10a of the chip element 10 can be exposed. The conductive material 40 is formed on both end surfaces 10a of the chip element 10 so that both end surfaces 10a may become conductive. More specifically, the chip element 10 is soaked in a conductive solution containing the conductive material 40 so that the conductive solution may adhere to both end portions of the chip element 10. As a result, the conductive material 40 is formed on both end portions of the chip element 10.

Figure 7A:
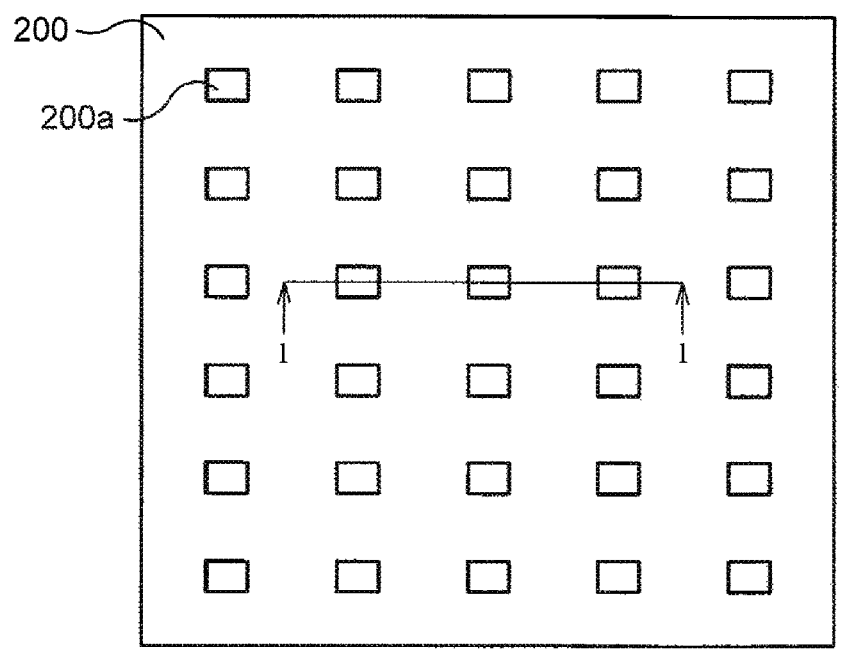
FIG. 7(a) and FIG. 7(b) illustrate a mask used in a manufacturing method for an electronic component of the present disclosure.
Figure 7B:
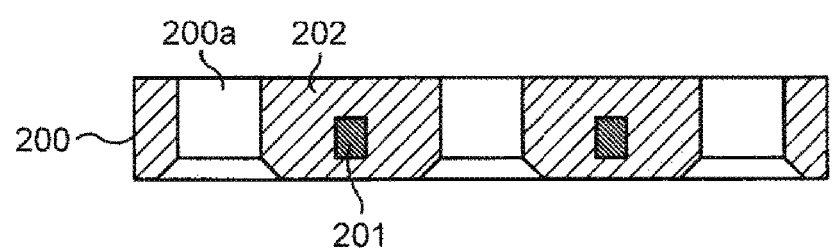

As shown in FIG. 7(a), the mask 200 has plural rectangular holes 200a that are arranged in a matrix form. The mask 200 is configured such that stainless cores 201 are covered with rubber 202, as shown in FIG. 7(b). Each hole 200a corresponds to one element 10. However, the size of a hole 200a is smaller than one chip element 10.

When inserting the chip element 10 into a hole 200a, the chip element 10 is squeezed into the hole 200 from one side of the mask 200 by using a rod-like member. Then, both end portions of the chip element 10 can be exposed outside the hole 200a. Alternatively, only one end portion of the chip element 10 may be exposed outside the hole 200a.

Figure 8A:
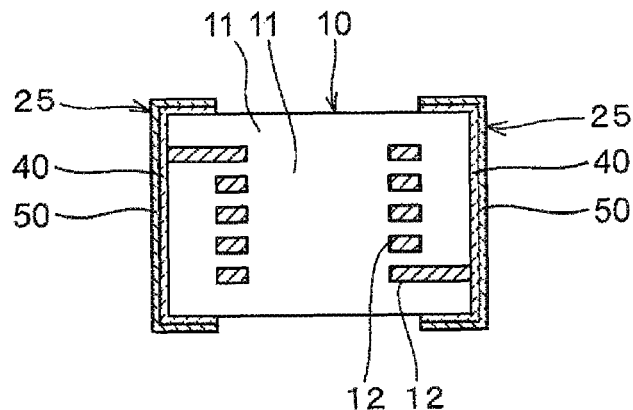
FIG. 8(a) through FIG. 8(d) illustrate a manufacturing method for the electronic component according to the third embodiment.

Thereafter, the chip element 10 provided with conductivity by the adhesion of the conductive material 40 is removed from the mask 200. Then, as a result of performing electrolytic plating by soaking the chip element 10 in a plating bath, the metal plated layer 50 is formed on the end portions of the chip element 10 provided with the conductive material 40, as shown in FIG. 8(a). The metal plated layer 50 is formed to cover the conductive material 40.

The metal plated layer 50 is a Cu-plated layer. When plating is performed, the use of Cu makes it easier for the Cu-plated layer to adhere to the conductive material 40.

In this manner, the outer electrode bodies 25 constituted by the conductive material 40 and the metal plated layer 50 are formed.

Figure 8B:
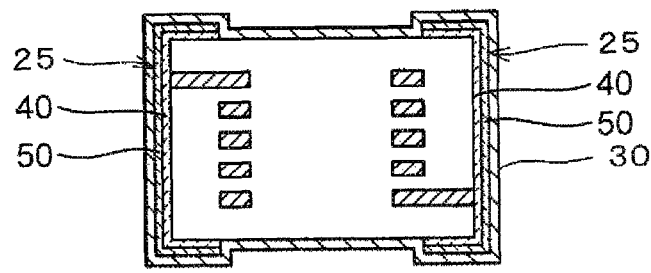

Then, as shown in FIG. 8(b), the insulating layer 30 is formed on the entire surface of the chip element 10 including the outer electrode bodies 25.

As the material for the insulating layer 30, a resin material having a high absorption coefficient for laser light L is used, as in the first embodiment.

Figure 8C:
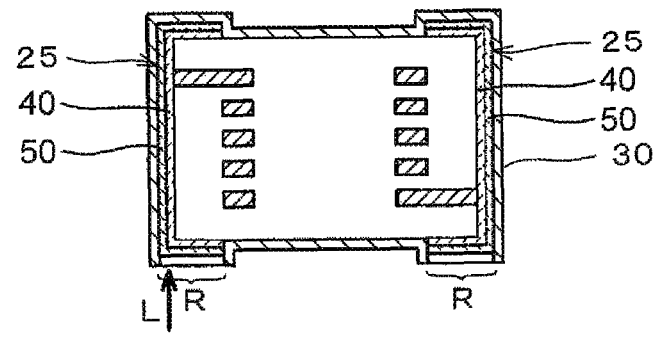

Then, as shown in FIG. 8(c), laser light L is applied to the insulating layer 30 in the predetermined regions (bottom surface regions) R, thereby removing the insulating layer 30 in the bottom surface regions R. That is, by removing the insulating layer 30 covering the outer electrode bodies 25 in the bottom surface regions R, the outer electrode bodies 25 are exposed on the bottom surface 10c.

The resin material forming the chip element 10 is covered with the metal plated layer 50 that is hard to absorb laser light. Consequently, the resin material forming the chip element 10 is not removed in the step of removing the insulating layer 30 in the predetermined regions R by the application of laser light L. The exposed regions of the outer electrode bodies 25 can thus be formed into a desired shape.

Figure 8D:
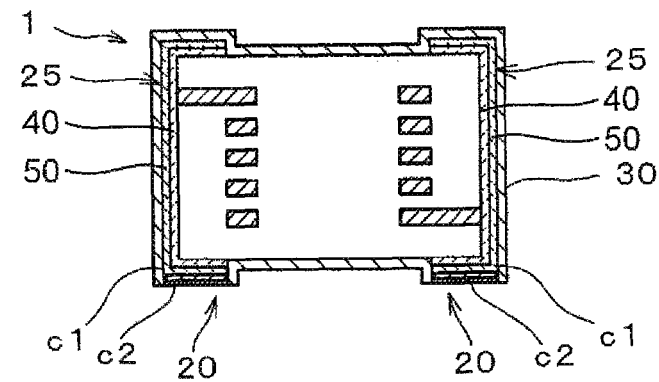

Then, as shown in FIG. 8(d), the Ni-plated layer c1 is formed as an underlying layer on the surface of each of the outer electrode bodies 25 exposed in the bottom surface regions R. The Sn-plated layer c2 is then formed on the surface of the Ni-plated layer c1 as the outermost layer.

Forming of the Sn-plated layer c2 increases the reliability of bonding the electronic component 1 to a mounting subject by using solder. The Ni-plated layer c1 can prevent mutual diffusion between the Cu-plated layer and the Sn-plated layer c2. The Ni-plated layer c1, which is disposed between the Cu-plated layer and the Sn-plated layer c2, can also prevent whiskering which would occur between the Cu-plated layer and the Sn-plated layer c2.

As a result, the electronic component 1 configured as shown in FIG. 5(a) and FIG. 5(b) is obtained.

Another mode of the third embodiment will be discussed below. The configuration different from that of the electronic component 1 illustrated in FIG. 5(a) and FIG. 5(b) will be described.

Figure 9A:
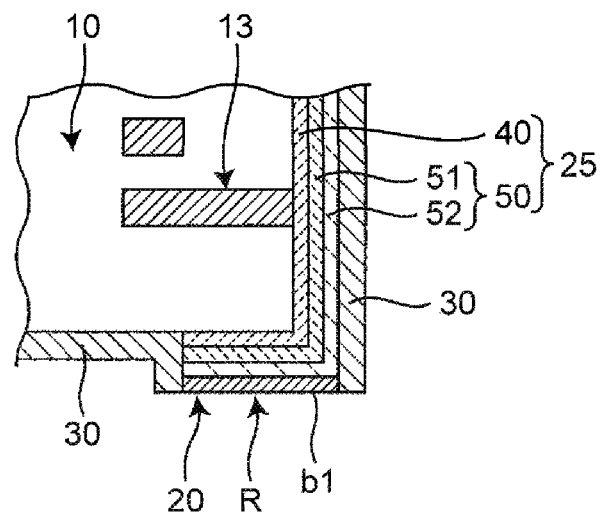
FIG. 9(a) and FIG. 9(b) illustrate different modes of the electronic component according to the third embodiment.

As shown in FIG. 9(a), the metal plated layer 50 is constituted by a Cu-plated layer 51 and a Ni-plated layer 52 covering the Cu-plated layer 51. The coating plated layer is a Sn-plated layer b1. In the metal plated layer 50, the Ni-plated layer 52 covers the entirety of the Cu-plated layer 51. However, the Ni-plated layer 52 may cover a portion of the Cu-plated layer 51 only corresponding to the predetermined region R.

The Ni-plated layer 52 can prevent mutual diffusion between the Cu-plated layer 51 and the Sn-plated layer b1. The Ni-plated layer 52, which is disposed between the Cu-plated layer 51 and the Sn-plated layer b1, can also prevent whiskering which would occur between the Cu-plated layer 51 and the Sn-plated layer b1.

A manufacturing method for this electronic component 1, which is different from that for the electronic component 1 shown in FIG. 8(a) through FIG. 8(d), will be described below.

In FIG. 8(a), the metal plated layer 50 is formed by the Cu-plated layer 51 and the Ni-plated layer 52 covering the Cu-plated layer 51. When plating is performed, the use of Cu makes it easier for the Cu-plated layer 51 to adhere to the conductive material 40. The Ni-plated layer 52 protects the Cu-plated layer 51.

In FIG. 8(d), the Sn-plated layer b1 is formed to cover the region of the outer electrode body which is exposed by removing the insulating layer. Forming of the Sn-plated layer b1 increases the reliability of bonding the electronic component 1 to a mounting subject by using solder.

Another mode of the third embodiment will be discussed below. The configuration different from that of the electronic component 1 illustrated in FIG. 5(a) and FIG. 5(b) will be described.

Figure 9B:
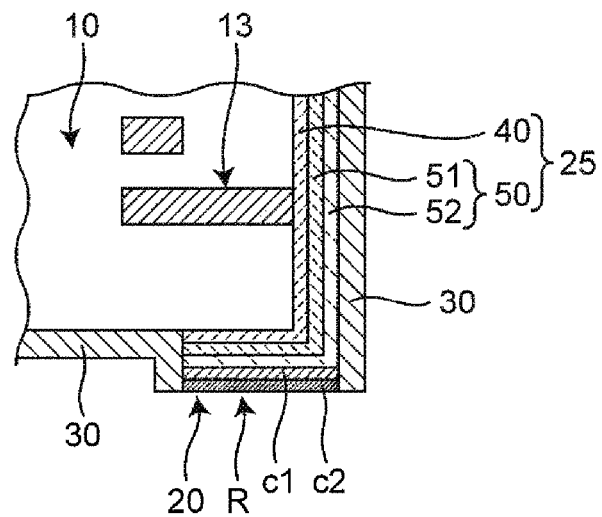

As shown in FIG. 9(b), the metal plated layer 50 is constituted by a Cu-plated layer 51 and a Ni-plated layer 52 covering the Cu-plated layer 51. The coating plated layer is constituted by a Ni-plated layer c1 and a Sn-plated layer c2 covering the Ni-plated layer c1.

The Ni-plated layers 52 and c1 can prevent mutual diffusion between the Cu-plated layer 51 and the Sn-plated layer c2. The Ni-plated layers 52 and c1, which are disposed between the Cu-plated layer 51 and the Sn-plated layer c2, can also prevent whiskering which would occur between the Cu-plated layer 51 and the Sn-plated layer c2.

A manufacturing method for this electronic component 1, which is different from that for the electronic component 1 shown in FIG. 8(a) through FIG. 8(d), will be described below.

In FIG. 8(a), the metal plated layer 50 is formed by the Cu-plated layer 51 and the Ni-plated layer 52 covering the Cu-plated layer 51. When plating is performed, the use of Cu makes it easier for the Cu-plated layer 51 to adhere to the conductive material 40. The Ni-plated layer 52 protects the Cu-plated layer 51. Thereafter, the same steps as those discussed with reference to FIG. 8(b) through FIG. 8(d) are performed.

When removing the insulating layer 30 in the predetermined region R by the application of laser light L, as shown in FIG. 8(c), so as to expose the predetermined region R of the outer electrode body 25, the Ni-plated layer 52 of the metal plated layer 50 is oxidized by heat of laser light. To address this issue, in this method, a Ni-plated layer is formed again as the Ni-plated layer c1 of the coating plated layer, and then, the Sn-plated layer c2 is formed, as shown in FIG. 8(d).

Figure 10A:
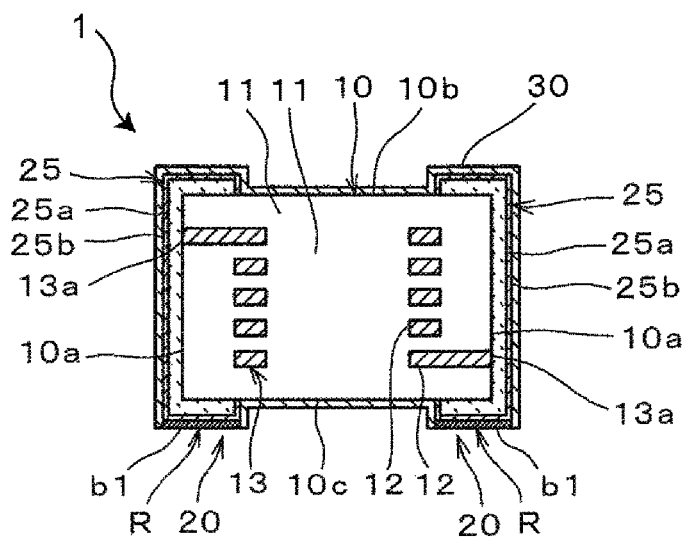
FIG. 10(a) and FIG. 10(b) illustrate another electronic component manufactured by the manufacturing method for the electronic component according to the first embodiment.
Figure 10B:
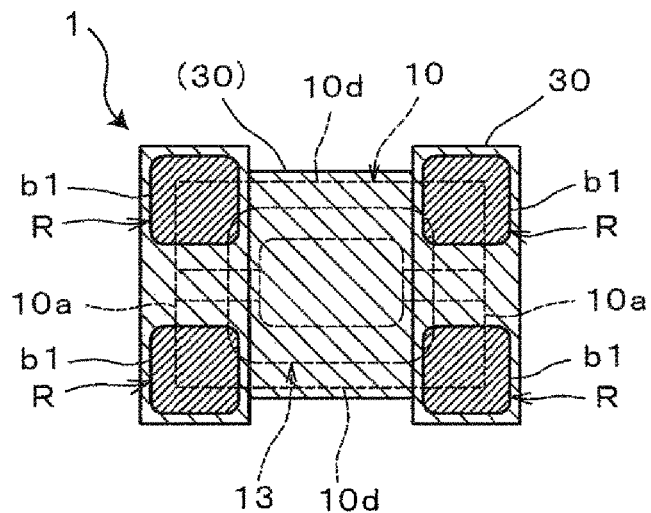

In the above-described first embodiment, as the regions (bottom surface region) R where the insulating layer 30 is removed, one portion of one of a pair of outer electrodes 20 on one side, and another portion of the other outer electrode 20 on the other side are set. That is, a total of two portions are set as the regions R. As shown in FIG. 10(a) and FIG. 10(b), however, plural bottom surface regions R (two in FIG. 10(b)) may be formed in one outer electrode 20, and plural bottom surface regions R (two in FIG. 10(b)) may be formed in the other outer electrode 20.

That is, the insulating layer may be removed by applying laser light to the insulating layer covering plural separate portions (two or more portions) of one outer electrode body and also by applying laser light to the insulating layer covering plural separate portions (two or more portions) of the other outer electrode body. This modification may also be applied to the second and third embodiments.

Figure 11A:
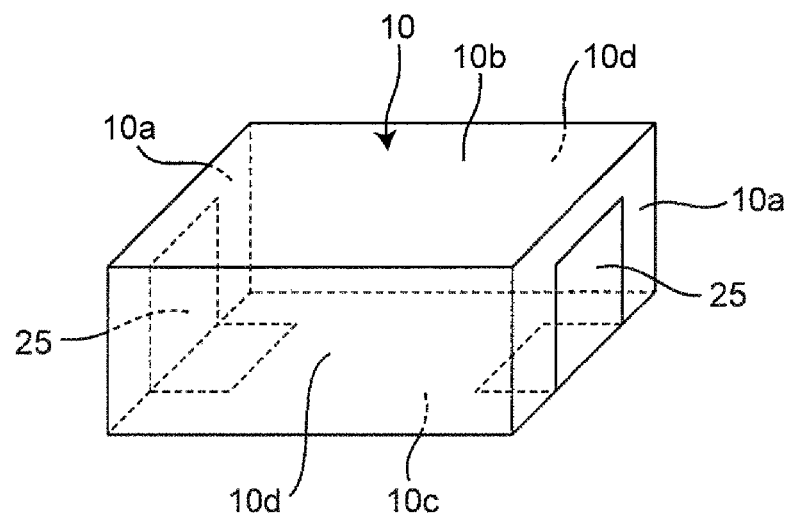
FIG. 11(a) and FIG. 11(b) illustrate electronic components different from the electronic components according to the first through third embodiments of the present disclosure.
Figure 11B:
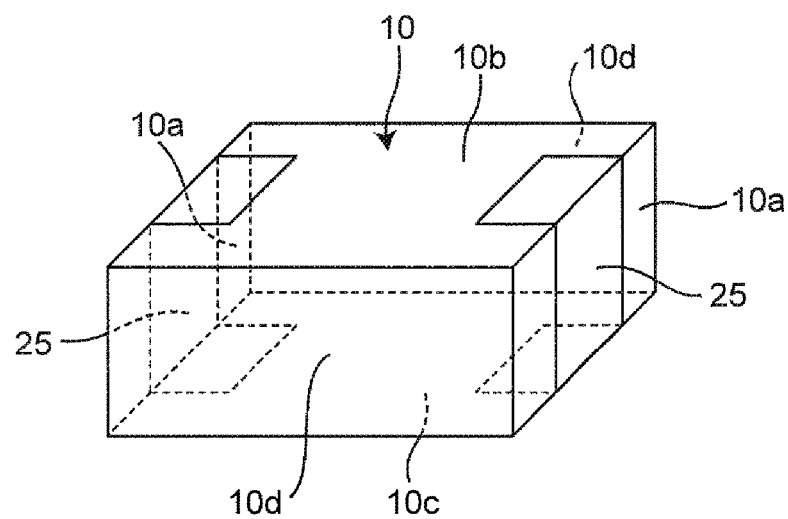
Figure 12:
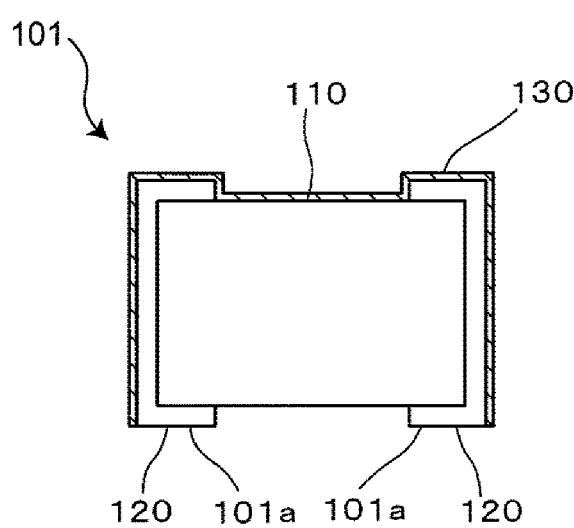
FIG. 12 illustrates a known electronic component.
Figure 13A:
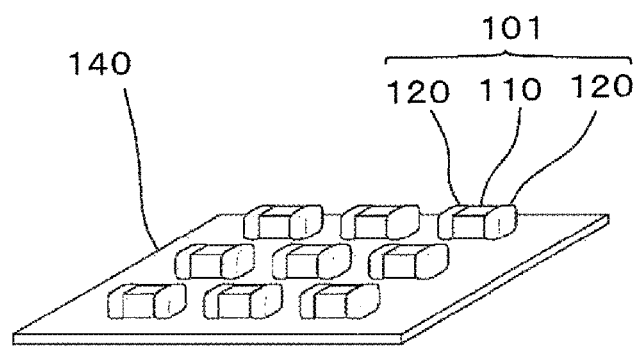
FIG. 13(a) through FIG. 13(c) illustrate a manufacturing method for the known electronic component.
Figure 13B:
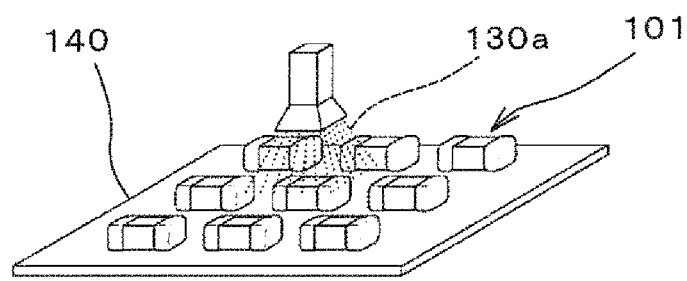
Figure 13C:
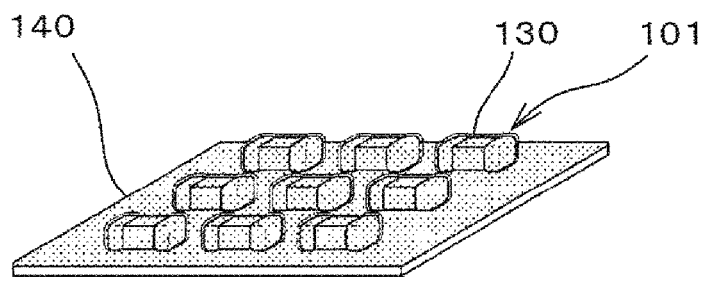

In the first through third embodiments, the outer electrode body 25 is a five-sided electrode disposed on one end surface 10a, the top surface 10b, the bottom surface 10c, and both side surfaces 10d. However, as shown in FIG. 11(a), the outer electrode body 25 may be an L-shaped electrode disposed on one end surface 10a and the bottom surface 10c. Alternatively, as shown in FIG. 11(b), the outer electrode body 25 may be an angular C-shaped electrode disposed on one end surface 10a, the top surface 10b, and the bottom surface 10c.

In the first through third embodiments, the insulating layer 30 on the bottom surface 10c of the chip element 10 is removed. However, the insulating layer 30 on the end surface 10a may also be removed.

For example, by exposing part of the outer electrode 20 on the end surface 10a, when the electronic component 1 is mounted on a mounting subject, the exposed portion of the outer electrode 20 on the end surface 10a may also be used for bonding, thereby further improving the reliability of bonding the electronic component 1 to the mounting subject.

Instead of covering the entirety of the surfaces of the chip element 10, only the outer electrode bodies 25 may be covered.

In the above-described embodiments, a multilayer inductor is used as an electronic component by way of example. However, the present disclosure is applicable to various other electronic components, such as multilayer capacitors, multilayer thermistors, multilayer LC composite components, wiring coil components, and noise filters.

Regarding the other aspects, too, the present disclosure is not restricted to the above-described embodiments. Various applications and modifications may be made within the scope of the disclosure.

The invention claimed is:

1. A manufacturing method for a discrete electronic component, comprising:
    forming an insulating layer on an outer electrode body of the discrete electronic component so as to cover the outer electrode body, the outer electrode body being formed on a single chip element which constitutes the discrete electronic component; and
    removing the insulating layer located in a predetermined region of the outer electrode body of the discrete electronic component so as to expose the predetermined region by applying laser light to the insulating layer in the predetermined region, the insulating layer having a higher absorption coefficient for the laser light than that of a material constituting a surface of the outer electrode body, wherein
    the predetermined region of the outer electrode body is a region of the outer electrode body having the insulating material removed and where the outer electrode body of the discrete electronic component is configured to be bonded to a mounting subject directly or via a plated layer.

2. The manufacturing method according to claim 1, wherein the outer electrode body includes an electrode body and a metal plated layer, the electrode body is formed on the chip element and made of an electrically conductive resin material, and the metal plated layer is formed to cover the electrode body.

3. The manufacturing method according to claim 2, wherein the metal plated layer is a Ni-plated layer.

4. The manufacturing method according to claim 2, further comprising:
    forming a Sn-plated layer to cover the region of the outer electrode body which is exposed by removing the insulating layer.

5. The manufacturing method according to claim 1, wherein the outer electrode body is made of a material which does not contain a resin component.

6. The manufacturing method according to claim 5, further comprising:
    forming a coating plated layer to cover the region of the outer electrode body which is exposed by removing the insulating layer.

7. The manufacturing method according to claim 6, wherein the forming of the coating plated layer includes forming a Ni-plated layer as an underlying layer and forming a Sn-plated layer as an outermost layer.

8. The manufacturing method according to claim 1, wherein the chip element is constituted by a composite material of a resin material and a metal powder; and
    the outer electrode body is constituted by a conductive material formed on the chip element and a metal plated layer formed to cover the conductive material.

9. The manufacturing method according to claim 8, wherein the metal plated layer is a Cu-plated layer.

10. The manufacturing method according to claim 8, wherein the metal plated layer is constituted by a Cu-plated layer and a Ni-plated layer formed to cover the Cu-plated layer.

11. The manufacturing method according to claim 10, further comprising:
    forming a Sn-plated layer to cover the region of the outer electrode body which is exposed by removing the insulating layer.

12. The manufacturing method according to claim 9, further comprising:
    forming a Ni-plated layer as an underlying layer and a Sn-plated layer as an outermost layer so as to cover the region of the outer electrode body which is exposed by removing the insulating layer.

13. The manufacturing method according to claim 1, wherein the outer electrode body is formed on each of both end portions of the chip element, and
    the laser light is applied to the insulating layer in a plurality of separate portions of each of the outer electrode bodies so as to remove the insulating layer in the plurality of separate portions.

14. The manufacturing method according to claim 1, wherein a material constituting the insulating layer is a resin material.

15. The manufacturing method according to claim 14, wherein the laser light has a wavelength of 1.06 μm to 10.6 μm.

16. The manufacturing method according to claim 1, wherein the outer electrode body includes an electrode body and a metal plated layer.

17. The manufacturing method according to claim 16, wherein
    the metal plated layer is a Ni-plated layer; and the method further comprises:
    forming an Sn-plated layer as the plated layer on the Ni-plated layer in the exposed predetermined region.

18. The manufacturing method according to claim 1, wherein the plated layer covers the exposed predetermined region of the outer electrode body, directly contacts the insulating layer, and is configured to be directly bonded to a mounting subject.

19. The manufacturing method according to claim 1, wherein
    the insulating layer includes portions surrounding the outer electrode body of the chip element except for the exposed predetermined region and an outer surface of the insulating layer is exposed on at least three sides of the electronic component.

* * * * *